US012705674B2

(12) United States Patent
Mahler-Haug et al.

(10) Patent No.: US 12,705,674 B2
(45) Date of Patent: Aug. 11, 2026

(54) CLAIMS PROCESSING WITH EXTRACTED CLAIM VARIABLES

(71) Applicant: Allstate Insurance Company, Northbrook, IL (US)

(72) Inventors: Olivia Mahler-Haug, Seattle, WA (US); Corey Fyock, Geneva, IL (US); Isabella DeRosa, Charlotte, NC (US); Nicole Bauer, Chicago, IL (US); Julio Castaneda, Chicago, IL (US); Daniel Kashkett, Frederick, MD (US)

(73) Assignee: Allstate Insurance Company, Northbrook, IL (US)

( * ) Notice: Subject to any disclaimer, the term of this patent is extended or adjusted under 35 U.S.C. 154(b) by 66 days.

(21) Appl. No.: 18/456,336

(22) Filed: Aug. 25, 2023

(65) Prior Publication Data

US 2025/0069148 A1 Feb. 27, 2025

(51) Int. Cl.
*G06Q 40/08* (2012.01)

(52) U.S. Cl.
CPC .................................... *G06Q 40/08* (2013.01)

(58) Field of Classification Search
CPC ...................................................... G06Q 40/08
See application file for complete search history.

(56) References Cited

U.S. PATENT DOCUMENTS

| | | | | |
|---|---|---|---|---|
| 2016/0012544 | A1 | 1/2016 | Ramaswamy et al. | |
| 2018/0122015 | A1 | 5/2018 | Drennan | |
| 2021/0366049 | A1* | 11/2021 | Hur | G06Q 10/10 |
| 2022/0005588 | A1 | 1/2022 | Ricci et al. | |
| 2022/0101447 | A1 | 3/2022 | Hibbert-Iacobacci et al. | |
| 2022/0164893 | A1 | 5/2022 | Difranco | |
| 2022/0301072 | A1* | 9/2022 | Wang | G06N 3/0442 |
| 2022/0309592 | A1* | 9/2022 | Zahora | G06Q 10/10 |
| 2023/0110486 | A1* | 4/2023 | Patt | G06Q 10/10 705/4 |

* cited by examiner

*Primary Examiner* — Scott S Trotter

(57) ABSTRACT

A provider computing system includes a claims database storing claim statements for a plurality of claims, the claim statements including a plurality of claim variable, an orchestration circuit storing computer-executable instructions embodying one or more machine learning models, at least one processor, and at least one memory, the at least one memory storing instructions that, when executed by the at least one processor, cause the at least one processor to perform operations. The operations include receive a first claim statement corresponding to a new claim; cause, by the orchestration circuit, the one or more machine learning models to parse the first claim statement; determine a first claim variable from the first claim statement; generate, by the orchestration circuit, a response including a request for a second claim statement; and transmit the request for a second claim statement.

19 Claims, 9 Drawing Sheets

600
602
604
Please tell us what happened.
606
Type your answers below.
602
604
Please tell us what happened.
606
I was at an intersection and another vehicle hit me.
610
612
You mentioned you were in an intersection, what lane were you in?
614
Left Turn Lane
Middle Lane
Right Turn Lane
Other
620
622
Was traffic directed by any of the following?
624
Stop sign
Traffic light
Yield sign

CLAIMS PROCESSING WITH EXTRACTED CLAIM VARIABLES

TECHNICAL FIELD

The present disclosure relates generally to systems and methods for gathering insurance claim information from a client for an insured vehicle. As utilized herein, the terms "claim information," "claim variables," and other similar terms may refer to data required to make a judgement surrounding the damage to a vehicle.

BACKGROUND

Insurance claims are provided to insurance providers to receive insurance benefits, such as payouts, when an insured vehicle is stolen or damaged. Insurance providers may use statements surrounding an insurance claim to analyze insurance claims in order to determine damage severity and the associated cost of damages and/or financial liability in a given time period. However, gathering large amounts of insurance or claim data from a user can be time consuming and challenging.

SUMMARY

At least one embodiment relates to a provider computing system. The provider computing system includes a communication interface structured to communicatively couple the provider computing system to a network. The provider computing system also includes a claim statement database that stores claim information for a plurality of claim statements. The claim statements include a plurality of claim variables. The provider computing system also includes a orchestration circuit storing computer-executable instructions embodying one or more machine learning models. The provider computing system also includes at least one processor and at least one memory storing instructions that, when executed by the at least one processor, cause the at least one processor to: receive a first claim statement corresponding to a new claim; cause, by the orchestration circuit, the one or more machine learning models to parse the first claim statement; determine a first plurality of claim variables from the first claim statement; generate, by the orchestration circuit, a response including a request for a second claim statement; transmit the request for a second claim statement.

Another embodiment relates to a method. The method includes communicatively coupling, by a communication interface, a provider computing system to a network; receiving, from a user device, a first claim statement corresponding to a first claim; parsing, by one or more machine learning models associated with the orchestration circuit of the provider computing system, the first claim statement; extracting, by the provider computing system, a first set of claim variables from the first claim statement; comparing the first set of claim variables to a predetermined set of required claim variables; responsive to determining that at least one required claim variable of the set of required claim variables is not present in the first set of claim variables, generating, by the orchestration circuit of the provider computing system, a request for a second claim statement; transmitting the request for the second claim statement to the user device; receiving the second claim statement corresponding to the first claim; parsing, by the one or more machine learning models associated with the orchestration modeling circuit of the provider computing system, the second claim statement; extracting, by the provider computing system, a second set of claim variables from the second claim statement; comparing the first set of claim variables and the second set of claim variables to the predetermined set of required claim variables; and responsive to determining that each of the required claim variables of the set of required claim variables are in at least one of the first set of claim variables or the second set of claim variables, causing the user device to display the first set of claim variables and the second set of claim variables.

Another embodiment relates to a computing system for processing insurance claims. The computing system includes a communication interface structured to communicatively couple the computing system to a network, a orchestration circuit storing computer-executable instructions embodying one or more machine learning models, at least one processor; and at least one memory, the at least one memory storing instructions that, when executed by the at least one processor, cause the at least one processor to perform operations. The operations include receive a first claim statement corresponding to a new claim; cause, by the orchestration circuit, the one or more machine learning models to parse the first claim statement; determine a first set of claim variables based on parsing the first claim statement; provide the first set of claim variables to a claims processing server via the network; receive, from the claims processing server, at least one of: an indication that at least one claim variable is missing from the first set of claim variables, or an indication that the first set of claim variables is complete; responsive to receiving the indication that the at least one claim variable is missing from the first set of claim variables, generate, by the orchestration circuit, a response including a request for a second claim statement; transmit the request for a second claim statement; responsive to receiving the indication that the first set of claim variables is complete, provide the first set of claim variables to a claims processing server; receive, from the claims processing server, a claim outcome; and cause the user device to display the claim outcome.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
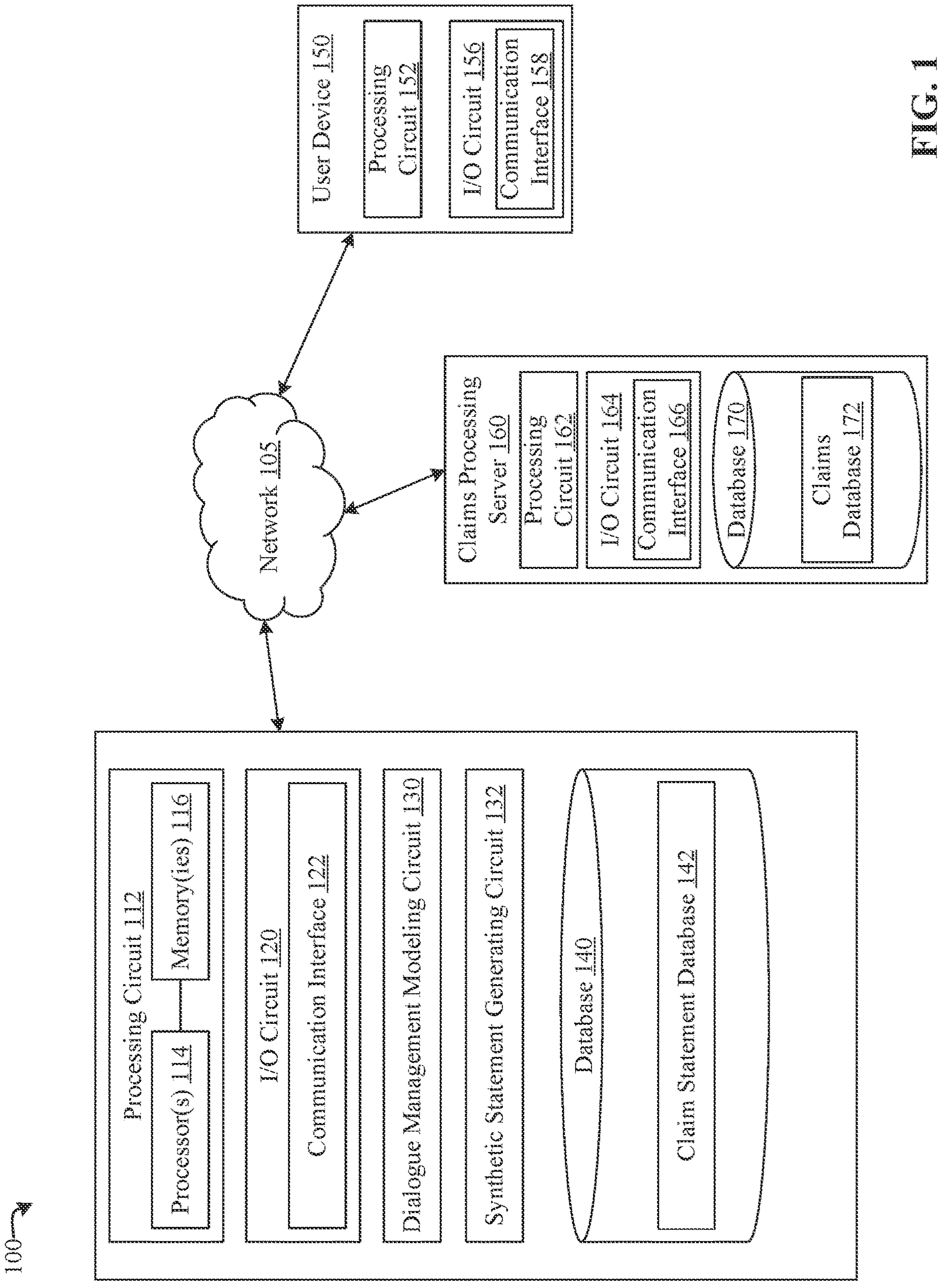
FIG. 1 is a block diagram of a computing system, according to various example embodiments.

Referring generally to the figures, disclosed are systems, methods and non-transitory computer-readable media for a provider computing system for determining claim variables.

In conventional claim data aggregation systems, claim variables are aggregated to provide claim data for a particular insurance claim by a scripted telephone call, followed by one or more human-to-human interactions, such as insured and claims adjuster engaging in a telephone call to fill in missing information. The human-to-human interactions generally utilize the claims adjuster's experience and skills to elicit claims statements from the insured. Conventional claim data aggregation therefore results in large time costs to gather all required variables to evaluation and process a new claim. Alternatively, the conventional computer method of claim data aggregation system requires a strict scripted series of inputs to collect all necessary variables for a claim.

Accordingly, the systems, methods and computer-executable media described herein provide an improved computing system for extracting claim data from a user, such as a provider employee, a provider customer, or another user, such as a customer of a different provider. The improved computing systems advantageously extract "claim variables" from a "claim statement" in natural language, rather than requiring a phone call or traditional automated claim recording. Furthermore, the improved computing systems described herein provide a dynamic user experience by automatically and dynamically generating user interfaces (e.g., questions, prompts, multiple choice selections, etc.) in a non-predetermined order base on the extracted claim variables.

As used herein a "claim statement" refers to a user-generated set of data including information regarding a claim. The claim statement may include one or more user inputs regarding the claim. In some embodiments, the one or more user inputs may include one or more inputs such as text inputs (e.g., from a keyboard or virtual keyboard, etc.), audio inputs (e.g., a voice input, which may be converted to text using a speech-to-text software, etc.), visual inputs (e.g., pictures, videos, which may be analyzed by an image recognition software, such as optical character recognition, object recognition, or other suitable image recognition software). For example, the one or more inputs may include text documents such as a Word® document, a free form text input, and/or other text inputs. In some embodiment, the one or more inputs may be authored by the user and/or another individual. In some embodiments, the one or more user inputs may include a user selection from a list of options (e.g., a selection of one or more choices from a list of options, etc.). A provider (e.g., an insurance provider) may receive the claim statement. In some embodiments, one or more claim statements may include information regarding the same claim.

As used herein a "claim variable" refers to a data point that is extracted from a claim statement. More specifically, a claim variable refers to a data point that is extracted from the data set of the claim statement. In some embodiments a claim variable includes a portion of the information regarding a claim. For example, a claim variable may include a portion of the one or more inputs and/or an indication of the one or more user inputs.

Additionally, the systems, methods, and computer-executable media described herein provide an improved user interface that advantageously allows for the input of claim statements. The improved user interface may reduce the amount of claim statements and data transmission necessary for a user to complete the necessary statements for claim processing. Accordingly, the improved user interface allows the user to recite the sequence of events, rather than following a strict scripted ingest of claim data.

Additionally, the systems, methods, and computer-executable instructions herein embody a self-correcting claim variable predictive system that is periodically re-trained using current data as well as augmented claim data such that the system can better extract and judge claim variables from a claim statement over time.

In an example illustrative scenario, a provider (e.g., an insurance provider) receives a request for a new claim (also referred to as a notice of loss or a first notice of loss) on an insured item, such as a vehicle or boat. In some embodiments, a claim statement is included, at least in part, within the new insurance claim request. The claim statement includes information regarding one or more claim variables. In some embodiments, a provider computing system may receive some or the entirety of a claim statement from another computing device associated with a customer of the provider (e.g., a user insured by the provider), a claimant of the provider (e.g., a user that makes a claim against the provider), a provider employee, or a provider agent. The provider computing system may include one or more machine learning models embodied in one or more circuits for analyzing the claim statements. The provider computing system may parse a claims statement or statements or otherwise determine claim variables within a claims statement or statements. The provider computing system may provide a detailed user interface to display missing claim variables or request further information through another statement or user interactive format.

The one or more machine learning models may utilize one or more models, frameworks, or other software, programming languages, libraries, etc. In an example embodiment, the one or more machine learning models may utilize a base machine learning model, for example, a generative artificial intelligence (AI), such as a Generative Pre-trained Transformer (GPT) and/or other forms of generative AI, further trained with claim statements to analyze one or more statements for claim variables contained therein. In an example operating scenario, the one or more machine learning models are trained using claim data and claim statements associated with the claim data. The one or more trained machine learning models receive one or more claim statements and output and/or determine claim variables based upon the one or more claim statements. Accordingly, the one or more machine learning models may output and/or determine, using a GPT, claim variables for each of the one or more claim statements.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a block diagram of a computing system 100, according to example embodiments. In some embodiments, the computing system 100 is associated with (e.g., managed and/or) operated by a service provider, such as a business, an insurance provider, and the like. The computing system 100 includes a provider computing system 110, a user device 150, and a claims processing server 160. Each of the computing systems of the computing system 100 are connected by a network 105. Specifically, the provider computing system 110, the user device 150, and the claims processing server 160 are communicatively coupled to the network 105 such that the computing network 105 permits the direct or indirect exchange of data, values, instructions, messages and the like (represented by the double-headed arrows). In some embodiments, the network 105 is configured to communicatively couple to additional computing system(s). For example, the network 105 may facilitate communication of data between the provider computing system 110 and other computing systems associated with the service provider or with a customer of the service provider, such as a user device (e.g., a mobile device, smartphone, desktop computer, laptop computer, tablet, or any other computing system). The network 105 may include one or more of a cellular network, the Internet, Wi-Fi, Wi-Max, a proprietary provider network, a proprietary retail or service provider network, and/or any other kind of wireless or wired network.

In some embodiments, the provider computing system 110 may be a local computing system at a business location (e.g., a physical location associated with the service provider). In some embodiments, the provider computing system 110 may be a remote computing system such as a remote server, a cloud computing system, and the like. In some embodiments, the provider computing system may be part of a larger computing system, such as a multi-purpose server or other multi-purpose computing system. In some embodiments, the provider computing system 110 may be implemented on a third-party computing device operated by a third-party service provider (e.g., AWS, Azure, GCP, and/or other third party computing services).

As shown in FIG. 1, the provider computing system 110 includes a processing circuit 112, input/output (I/O) circuit 120, one or more specialized processing circuits shown as a logic, reasoning, and orchestration circuit 130 (also referred to herein as an "orchestration circuit"), synthetic statement generating circuit 132, and a database 140. The processing circuit 112 may be coupled to the I/O circuit 120, the specialized processing circuits 130 and/or 132, and/or the database 140. The processing circuit 112 may include a processor 114 and a memory 116. The memory 116 may be one or more devices (e.g., RAM, ROM, flash memory, hard disk storage) for storing data and/or computer code for completing and/or facilitating the various processes described herein. The memory 116 may be or include non-transient volatile memory, non-volatile memory, and non-transitory computer storage media. The memory 116 may include database components, object code components, script components, or any other type of information structure for supporting the various activities and information structures described herein. The memory 116 may be communicatively coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the provider computing system 110 is configured to run a variety of application programs and store associated data in a database of the memory 116 (e.g., database 140).

The I/O circuit 120 is structured to receive communications from and provide communications to other computing devices, users, and the like associated with the provider computing system 110. The I/O circuit 120 is structured to exchange data, communications, instructions, and the like with an I/O device of the components of the system 100. In some embodiments, the I/O circuit 120 includes communication circuitry for facilitating the exchange of data, values, messages, text, images, voice recordings, and the like between the I/O circuit 120 and the components of the provider computing system 110. In some embodiments, the I/O circuit 120 includes machine-readable media for facilitating the exchange of information between the I/O circuit 120 and the components of the provider computing system 110. In some embodiments, the I/O circuit 120 includes any combination of hardware components, communication circuitry, and machine-readable media.

In some embodiments, the I/O circuit 120 may include a communication interface 122. The communication interface 122 may establish connections with other computing devices by way of the network 105. The communication interface 122 may include program logic that facilitates connection of the provider computing system 110 to the network 105. In some embodiments, the communication interface 122 may include any combination of a wireless network transceiver (e.g., a cellular modem, a Bluetooth transceiver, a Wi-Fi transceiver) and/or a wired network transceiver (e.g., an Ethernet transceiver). For example, the I/O circuit 120 may include an Ethernet device, such as an Ethernet card and machine-readable media, such as an Ethernet driver configured to facilitate connections with the network 105. In some embodiments, the communication interface 122 includes the hardware and machine-readable media sufficient to support communication over multiple channels of data communication. In some embodiments, the communication interface 122 includes cryptography capabilities to establish a secure or relatively secure communication session in which data communicated over the session is encrypted.

In some embodiments, the I/O circuit 120 includes suitable I/O ports and/or uses an interconnect bus (e.g., bus 602 in FIG. 6) for an interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the I/O circuit 120 may provide an interface for the user to interact with various application and/or executable stored on the provider computing system 110. For example, the I/O circuit may include a keyboard, a keypad, a mouse, joystick, a touch screen, a microphone, a camera, a biometric device, a virtual reality/augmented reality headset, smart glasses and the like. As another example, the I/O circuit 120 may include, but is not limited to, a television monitor, a computer monitor, a printer, a facsimile, a speaker and so on.

The memory 116 may store a database 140, according to some embodiments. The database 140 may retrievable store data associated with the provider computing system 110 and/or any other component of the computing system 100. That is, the data may include information associated with each of the components of the computing system 100. For example, the data may include information about and/or received from the user device 150. That data may be retrievable, viewable, and/or editable by the provider computing system 110 (e.g., by user input via the I/O circuit 120).

The database 140 may be configured to store one or more applications and/or executables to facilitate any of the operations described herein. In some arrangements, the applications and/or executables may be incorporated with an existing application in use by the provider computing system 110. In some arrangements, the applications and/or executables are separate software applications implemented on the provider computing system 110. The applications and/or executables may be downloaded by the provider computing system 110 prior to its usage, hardcoded into the memory 116 of the processing circuit 112, or be a network-based or web-based interface application such that the provider computing system 110 may provide a web browser to access the application, which may be executed remotely from the provider computing system 110 (e.g., by a user device). Accordingly, the provider computing system 110 may include software and/or hardware capable of implementing a network-based or web-based application. For example, in some instances, the applications and/or executables include components written in HTML, XML, WML, SGML, PHP, CGI, and like languages. In the latter instance, a user (e.g., a provider employee) may log onto or access the web-based interface before usage of the applications and/or executables. In this regard, the applications and/or executables may be supported by a separate computing system including one or more servers, processors, network interfaces, and so on, that transmit applications for use to the provider computing system 110.

In the embodiment shown in FIG. 1, the database 140 includes a claim statement database 142. In some embodiments the claim statement may also include metadata associated with a claim, a claim variable, a time period, telematic data, a date, and/or other parameters related to the claim statement. As used herein "telematic data" may refer to data regarding the operation of a vehicle, such as vehicle speed, engine speed (e.g., rotations per minute), vehicle brake status, vehicle acceleration, and so on.

Claim statements can be received by parsing data from a claim statement data file or interface message. According to an embodiment, the claim statement database 142 is structured to store claim statements for a plurality of claims. Each claim statement includes information regarding a plurality of claim variables. Each claim variable may include information regarding, but are not limited to: an indication of whether the claim involved tow removal, whether or not the incident is covered under a policy contract, an indication of whether a vehicle door or doors is/are openable after an accident, an indication of fluid leak, an indication of an insured car body type, an indication of whether the claim was also reported to authorities, an indication of prior damage to an insured item, a location (e.g., country, state, region, county, city, etc.), a state highway study, a time (e.g., year, month, week, day, date, hour, etc.), an indication of whether the claim is from a no-fault state, state texting restrictions (e.g., phone usage restrictions), gross damage, an indication of whether a person was injured, details of any injuries that occurred, an indication of liability, and/or other parameters related to the claim. In the embodiment shown in FIG. 1, the claim statement database 142 may be stored by electronic storage other than the database 140. Accordingly, the computing system 100 may include a separate claim database containing claims statements that are stored at a claims processing server 160.

According to various embodiments, the provider computing system 110 includes any combination of hardware and software structured to facilitate operations of the components of the computing system 100. For example, and as shown in FIG. 1, the provider computing system includes a logic, reasoning, and orchestration circuit 130 and a synthetic statement generating circuit 132 for generating synthetic claim statements. More generally, the provider computing system 110 may include any combination of hardware and software including specialized processing circuits, applications, executables, and the like for controlling, managing, or facilitating the operation of the other computing systems of the computing system 100 including the user device 150.

In some embodiments, the logic, reasoning, and orchestration circuit 130 is structured to receive claim statements. The claim statements may be received from the user device 150, the claim statement database 142, the synthetic statement generating circuit 132, and/or another computing device (e.g., claims processing server 160) communicatively coupled to the network 105. The claim statement may include actual claim information relating to one or more claims. As utilized herein, "actual claim information" and/or "actual claim variables" within "actual claim statements" refers to claim data that is true and known for one or more claims and is utilized for claims processing.

As briefly described above, the logic, reasoning, and orchestration circuit 130 may also include claims generated by the synthetic statement generating circuit 132. In some embodiments, some claim scenario data will not be frequent enough to train one or more machine learning models. The synthetic statement generating circuit 132 can generate additional claims for training the one or more models embodied by the logic, reasoning, and orchestration circuit 130. As utilized herein, "synthetic claim information" and "synthetic claim variables" within "synthetic claim statements" refers to claim data that has been generated by the synthetic statement generating circuit 132 rather than actual or original claim data.

The logic, reasoning, and orchestration circuit 130 is structured to store computer-executable instructions embodying one or more machine learning models. The one or more machine learning models are configured to generate one or more claim variables as extracted from the claim statement. The logic, reasoning, and orchestration circuit 130 may be structured to train the one or more machine learning models based on the actual claim statements and/or synthetic claim statements such that the one or more machine learning models outputs and/or determines a set of claim variables. For example, the one or more machine learning models may be trained using training data that includes claim statements (e.g., stored at the claim statement database 142 or at the claims database 172) and pre-classified claim variables. In some embodiments, the pre-classified claim variables are classified by a user and/or by another machine learning model such that the one or more machine learning models may be trained using the pre-classified claim variables.

Additionally, the one or more machine learning models may be trained using training data that includes synthetic claim statements and synthetic claim variables. The one or more machine learning models are trained to generate predicted claim variables based on the training data. The one or more machine learning models may use natural language processing techniques to identify and/or extract information from an input of the claim statement(s) (e.g., text input, image input, audio input, video input, etc.). More specifically, the one or more machine learning models may identify specific words or phrases in the claim statement that correspond to a claim variable. The one or more machine learning models may extract the specific words or phrases from the claim statement to determine the claim variable. Additionally, the one or more machine learning models may determine a context of the claim statement (or a portion thereof) to determine the claim variables. That is, the context may be used to determine more specific information from broader information. For example, a user may recite in a claim statement "I turned left onto Main Street from Elm Street." The one or more machine learning models may determine, based on contextual information, that the user was most likely in a left turn lane, even though the user never specifically indicated that information.

The logic, reasoning, and orchestration circuit 130 may utilize the one or more trained machine learning models to determine and/or output the predicted claim variables. In some embodiments, the logic, reasoning, and orchestration circuit 130 may utilize generative AI to generate a response and/or a query for additional information. For example, the logic, reasoning, and orchestration circuit 130 may utilize the GPT to generate a response or query for additional information when predicted claim variables are incomplete for a claim.

In an example operational scenario, the logic, reasoning, and orchestration circuit 130 receives a claim statement (e.g., from the claim statement database 142 or the claims database 172). The logic, reasoning, and orchestration circuit 130 may run code and/or executables that define the one or more machine learning models. The code and/or executables may use parameters parsed from the claims data (e.g., claim statements) as input for the machine learning models. The code and/or executables may be embodied in the logic, reasoning, and orchestration circuit 130, stored by the memory 116, stored by the database 140, and/or accessed from a remote computing device via the network 105 and/or the communication interface 122. The code and/or executables may be compiled at runtime or before execution (e.g., an .exe file). Accordingly, the logic, reasoning, and orchestration circuit 130 may output and/or determine, using the one or more machine learning models including the generative pre-trained transformer model, a first set of predicted claim variables for a first claim statement. As described above, the one or more machine learning models receive a first claim statement as input. The one or more machine learning models generates a first set of predicted claim variables for the statement. As described above, the logic, reasoning, and orchestration circuit 130, using the one or more machine learning models, can generate a response or query for further statements (e.g., using a trained generative AI model). The logic, reasoning, and orchestration circuit 130 may also be structured to generate a user interface that includes the request for another statement, for example, where the first claims statement does not provide all required claim variables and/or if a claim variable is determined and, based on the determined claim variable, additional claim variables are needed. The one or more machine learning models can then receive a second claim statement as input and generate a second set of predicted claim variables for the second statement. The second set of predicted claim variables is analyzed to determine if the second set of claim variables provides the missing required claim variables and/or if a claim variable of the second set is determined and, based on the determined claim variable, additional claim variables are needed. This process may be repeated to provide all necessary claim variables. The combination of all claim variables can be used to complete the rest of the claim in an output claim data packet. The logic, reasoning, and orchestration circuit 130 may also be structured to generate a user interface that displays all predicted claim variables in a user interface.

In some embodiments, the logic, reasoning, and orchestration circuit 130 reviews the extracted claim variables for inconsistencies. For example, if a first claim variable extracted from a first claim statement and a second claim variable extracted from a second claim statement contradict each other, the logic, reasoning, and orchestration circuit 130 may generate a user interface that includes the request for another statement that prompts a user to confirm which of the contradicting claim variables is correct.

The user device 150 includes a processing circuit 152 and an I/O circuit 156. The processing circuit 152 and the I/O circuit 156 may be substantially similar in structure and/or function to the processing circuit 112 and I/O circuit 120. For example, the processing circuit 152 may include a processor and memory similar to the processor 114 and memory 116, and the I/O circuit 156 may include a communication interface 158 that is similar to the communication interface 122 within the I/O circuit 120. In some embodiments, the I/O circuit 120 may be coupled to a display device and/or an audio device. Additionally, the user device 150 may communicatively couple to the network 105 via the communication interface 158. The user device 150 is structured to send and receive data to/from other computing devices via the network 105. The data may include claims data and/or claim statements. For example, the user device 150 may be structured to collect claims data including claim statements for the one or more claim variables described above. The user device 150 may detect, by one or more device sensors, the claims data and/or the claims data may be entered into the user device 150 by a user (e.g., a provider customer, a claimant of the provider, a provider employee, a provider agent, etc.). The user device 150 may also be configured to receive the output claim data packet. The output claim data packet causing the user device to output via the I/O circuit 156 aspects of the output claim data packet. In some embodiments, the I/O circuit 156 may display a user interface on the user device 150. In some embodiments, the user interface is generated by the provider computing system 110 (e.g., the logic, reasoning, and orchestration circuit 130), and displayed on the user device 150. In other embodiments, the user interface is generated and displayed by the user device 150 based on the output claim data. In some embodiments, the I/O circuit 156 may output audio, video, or text feedback on aspects of the output claim data packet. In some embodiments the output feedback is generated by the provider computing system 110 (e.g., the logic, reasoning, and orchestration circuit 130), and output on the user device 150. In other embodiments, the output feedback is generated and output by the user device 150.

In some embodiments, the computing system 100 further includes a claim processing server 160. The claims processing server 160 includes a processing circuit 162, I/O circuit 164, and a database 170. The processing circuit 162 and I/O circuit 164 may be substantially similar in structure and/or function as the processing circuit 112 and I/O circuit 120 of the provider computing system 110. For example, the processing circuit 162 may include a processor and memory similar to the processor 114 and memory 116, and the I/O circuit 164 may include a communication interface 166 that is similar to the communication interface 122. Accordingly, the claims processing server 160 may communicatively couple to the network 105 via the communication interface 166. The database 170 may be substantially similar to the database 140. The database 170 may store a claims database containing claim information including claim statements in addition to and/or alternatively to the claim statement database 142.

In some embodiments, the user device 150 may provide claims data to the claims processing server 160. The claims processing server 160 may store claims data, including claim variables (e.g., for training the one or more models in the logic, reasoning, and orchestration circuit 130) and claim statements for every claim. The claims processing server 160 may provide the claims data to the provider computing system 110.

In some embodiments, the provider computing system 110 and the claims processing server are the same computing device or devices. Accordingly, the claims processing, logic, reasoning, and orchestration are completed by the same device. In other embodiments, the provider computing system 110 and the claims processing server 160 are physically separate computing systems that are communicatively coupled by the network 105.

Figure 2:
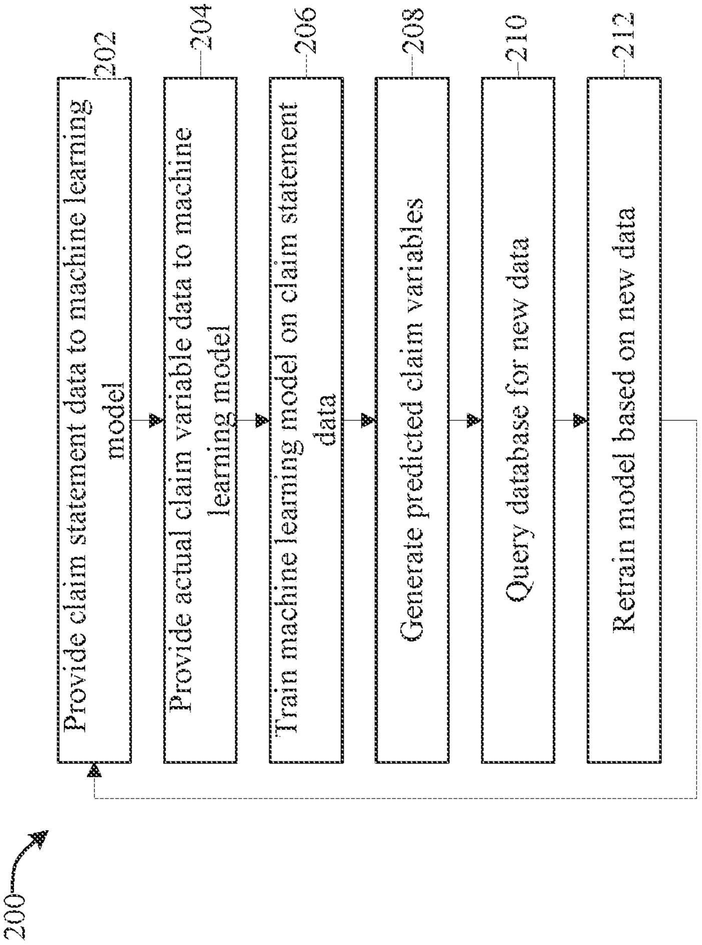
FIG. 2 is a flow diagram including computer-based operations for training a machine learning model.

FIG. 2 is a flow diagram including computer-based operations for training a machine learning model. In some arrangements, one or more of the computing systems of the system 100 may be configured to perform a method 200. For example, the provider computing system 110 may be structured to perform the method 200, alone or in combination with other devices, such as the user device 150 and/or the claims processing server 160. In some embodiments the method 200 may include inputs from a user (e.g., a provider employee), one or more user devices (such as devices of provider employees), another computing device on the network 105, and the like.

In broad overview of the method 200, at step 202 the provider computing system 110 provides claim statement data to the machine learning model. At step 204, the provider computing system 110 provides actual claim variable data to the machine learning models. At step 206, the provider computing system 110 trains the machine learning model based on the claim statement and actual claim variables. At step 208, the provider computing system 110 generates a set of predicted claim variables. At step 210, the provider computing system 110 queries a database for new claim statement data. At step 212, the machine learning model is re-trained based on the new data, and the method 200 repeats back up to step 202. In some arrangements the method 200 may include more or fewer steps than as shown in FIG. 2.

Referring to the method 200 in more detail, at step 202, the provider computing system 110 provides claim statement data to the machine learning model. For example, the logic, reasoning, and orchestration circuit 130 may receive the claim statement data from the claim statement database 142 and/or the claims database 172. Additionally, the logic, reasoning, and orchestration circuit 130 may also receive synthetic claim statement data generated by the synthetic statement generating circuit 132. The logic, reasoning, and orchestration circuit 130 may also receive claims data directly from the user device 150. At step 204, the provider computing system 110 provides actual claim variable data to the machine learning model. For example, the logic, reasoning, and orchestration circuit 130 may receive the actual claim variable data from the claims database 172. In some embodiments, each actual claim variable of the actual claim variable data is associated with a corresponding claim statement of the claim statement data.

At step 206, the provider computing system 110 trains the machine learning model based on the claim statement and the actual claim variables. The logic, reasoning, and orchestration circuit 130 trains the one or more machine learning models to predict claim variables based on an input claim statement. The claim statement may contain multiple claim variables within. The one or more machine learning models may be trained using a subset of the claim statements provided. In an example embodiment, a first plurality of claim variable and claim statement pairs are used to train on a plurality of combinations of model parameters to output and/or determine which of the one or more machine learning models generates predictions with the highest accuracy to the actual claim variables. The one or more machine learning models may iteratively generate predicted claim variables and self-correct until the matching accuracy of the predicted set of claim variables is within a tolerance threshold. The tolerance threshold may be a predetermined threshold (e.g., 95% claim variables matching within a set, etc.).

At step 208, the provider computing system 110 generates a set of predicted claim variables for the given claim statement. The logic, reasoning, and orchestration circuit 130 may generate, based on the one or more machine learning models, a set of predicted claim variables. The set of predicted claim variables may be generated for a claim statement that does not have actual claim variable data.

At step 210, the provider computing system 110 queries a database for new data. The logic, reasoning, and orchestration circuit may query the database 142 and/or the database 172 for the new claims/claim statement data. Advantageously, the process of retraining the machine learning model can be made fully automatic such that the logic, reasoning, and orchestration circuit self-corrects as new actual claim variable data becomes available in order to improve the accuracy of future predictions. Accordingly, the query that obtains new claim statements and/or new actual claim variable data may be automatically repeated in substantially real-time (e.g., every minute, every 5 minutes, every hour, etc.) or periodically (e.g., every day, every week, every month, etc.).

The one or more machine learning models may be re-trained or self-corrected on demand (e.g., by user input) and/or automatically in real-time (e.g., every millisecond, every second, every minute, etc.) and/or at regular intervals (e.g., every day, every week, every month, etc.). At step 212 the model is re-trained based on the new claim statements and/or the new actual claim variable data, and the method 200 repeats back to step 202 and/or step 204. For example, when the logic, reasoning, and orchestration circuit 130 receives new actual claim variable data for a claim statement, the logic, reasoning, and orchestration circuit 130 may re-train the one or more machine learning models based on the claim statement data and claim variable data. The new data can be run, by the logic, reasoning, and orchestration circuit 130, through the steps of the method 200 to re-train the machine learning model.

In some embodiments, the one or more machine learning models may be retrained based on data other than new claim statements and/or new actual claim variable data. In some embodiments, a supervised retraining process may be used to retrain the one or more machine learning models. For example, a supervised retraining process may include receiving input(s) from a user (e.g., a customer, a clamant, a provider employee, a provider agent, etc.) that indicate a correction to an extracted claim variable.

In some embodiments, the one or more machine learning models may be retrained based on determining contradictions in extracted claim variables. For example, if two or more extracted claim variables contracted each other, the one or more machine learning models may be automatically retrained to generate non-contradictory claim variables. For example, the one or more machine learning models may prompt a user (e.g., as described herein with respect to FIG. 4) to input information regarding the contradictory claim variables. In an example scenario, based on an original input by a user, the one or more machine learning models may extract a first extracted claim variable that indicates that an airbag of a vehicle was deployed and a second claim variable that indicates that the vehicle is drivable, contradicting the first claim variable. Responsive to determining that the second claim variable contradicts the first claim variable, the provider computing system 110 may prompt a user to input information regarding which claim variable (the first claim variable or the second claim variable) is correct. Responsive to receiving the user input, the provider computing system 110 may automatically retrain the one or more machine learning models to mitigate generating an incorrect claim variable based on the original input provided by the user.

In some embodiments, the one or more machine learning models may generate a confidence score for each extracted claim variable. A "confidence score" refers to a statistical probability that the extracted claim variable is correct. In these embodiments, the one or more machine learning models may be retrained based on a confidence score of a claim variable not satisfying a threshold score (e.g., less than a minimum score).

Figure 3:
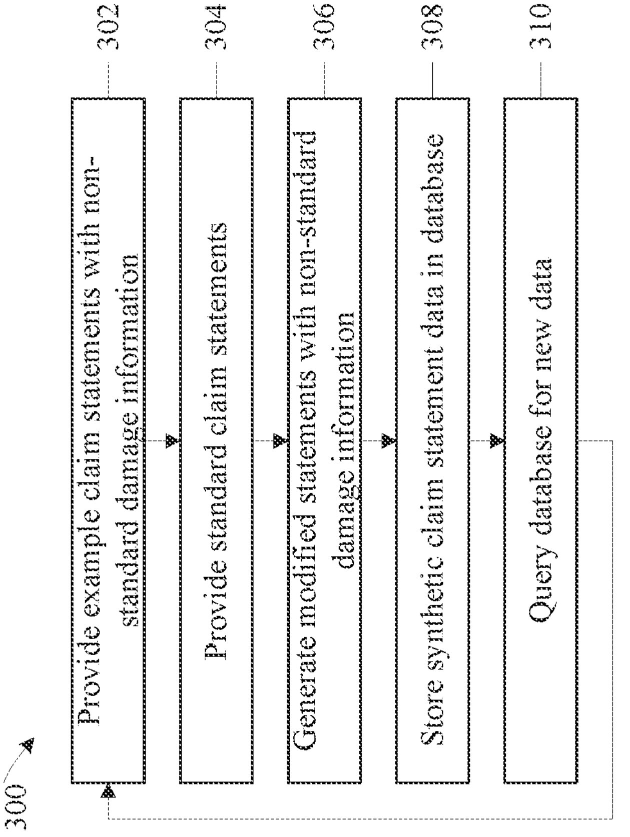
FIG. 3 is a flow diagram including computer-based operations for creating synthetic claim statements.

FIG. 3 is a flow diagram including computer-based operations for generating additional statements, known as synthetic statements herein. In some arrangements, one or more of the computing systems of the system 100 may be configured to perform a method 300. For example, the provider computing system 110 may be structured to perform the method 300, alone or in combination with other devices such as the user device 150 and/or the claims processing server 160. In some embodiments, the method 300 may include user inputs from a user (e.g., a provider employee, one or more user devices (such as devices of provider employees), another computing device on the network 105, and the like.

In broad overview of the method 300, at step 302, the provider computing system 110 provides claim statements to the one or more machine learning models. At step 304, the provider computing system 110 provides actual item damage severity data to the one or more machine learning models. At step 306, the provider computing system 110 utilizes the machine learning models to modify original claim statements and claim variables to generate synthetic claim statement data. At step 308, the provider computing system 110 stores the generated synthetic claim statement data to a database. At step 310 the provider computing system queries a database for additional claim statements. In some arrangements the method 300 may include fewer or more steps than as shown in FIG. 3.

Referring to the method 300 in more detail, at step 302, the provider computing system 110 provides claims statements to the one or more machine learning models. For example, the synthetic statement generating circuit 132 may receive the actual claim statement data from the claim statement database 142 and/or the claims database 172. The synthetic statement generating circuit 132 may also receive actual claim statements directly from the user device 150. At step 304, the provider computing system 110 provides actual claim variable data to the synthetic statement generating circuit 132. For example, the synthetic statement generating circuit may receive actual claim variable data from the database 142.

At step 306, provider computing system 110 generates a synthetic claim statement. The one or more machine learning models generate additional modified claim statements by the addition of one or more claim variables to an original claim statement. The one or more machine learning models generating the synthetic statement can be trained or retrained by the synthetic claim generating circuit 132 using a subset of claim statements to achieve a desired goal. For example, if more claim statements are needed citing property damage, the synthetic statement generating circuit 132 can be retrained with actual claim statements and claim variables containing information about property damage. The one or more machine learning models may be re-trained based to generate information automatically determined from the original claim statements or selected on demand (e.g., by user input). The one or more machine learning models may be re-trained or self-corrected on demand (e.g., by user input) and/or automatically in real-time (e.g., every millisecond, every second, every minute, etc.) and/or at regular intervals (e.g., every day, every week, every month, etc.).

At step 308, provider computing system 110 stores generated claim statement data to a database (e.g., database 140) with an acknowledgement that these statements are synthetically generated. Advantageously, the synthetic statement generating circuit 132 may also directly feed the logic, reasoning, and orchestration circuit 130 during method 200 to accelerate re-training of the one or more machine learning models within the logic, reasoning, and orchestration circuit. At step 310, the synthetic statement generating circuit 132 may automatically or on-demand (e.g., provider employee input) query a database (e.g., database 140 or database 172) to detect new unique claim statement data, and the method 300 repeats back to step 302. For example, when the synthetic statement generating circuit 132 receives new actual claim statements and variables surrounding property damage, the synthetic statement generating circuit 132 may generate additional synthetic statements replicating the property damage specific claim statement and claim variable information in additional claim statements. Then, these newly generated synthetic statements can be used to re-train the logic, reasoning, and orchestration circuit 130, through the steps of method 200.

Figure 4:
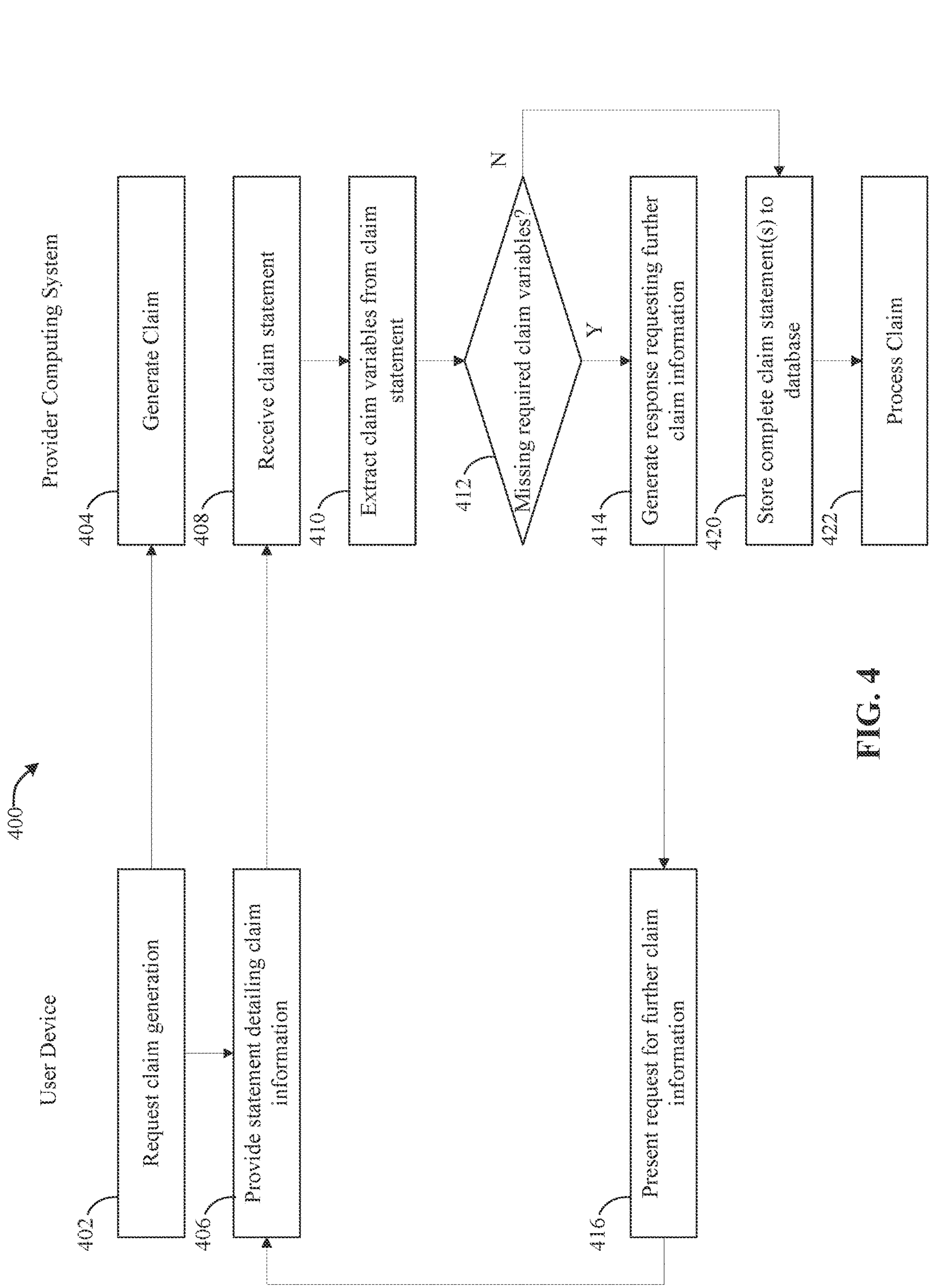
FIG. 4 is a flow diagram of a method of determining claim variables related to a new claim and claim statement, according to another example embodiment.

FIG. 4 is a flow diagram including computer-based operations for generating a set of claim variables from a request to generate a new claim. In some arrangements, one or more computing systems of the computing system 100 may be configured to perform the method 400. In some arrangements, the provider computing system 110 may be structured to perform the method 400 in combination with a user device 150. In other arrangements, the claims processing server 160 may be structured to perform the method 400 in combination with a user device 150.

In broad overview of the method 400, at step 402 the user device 150 receives an input to begin the process for generation of a new claim. At step 404, the provider computing system 110 initiates the creation of a claim. At step 406, the user device 150 receives a first claim statement from user input and transmits the first claim statement to the provider computing system 110. At step 408, the provider computing system 110 receives the first claim statement. At step 410, the provider computing system 110 extracts claim variables from the claim statement using the logic, reasoning, and orchestration circuit 130. At step 412, the provider computing system and/or the claims processing server 160 determine if required claim variables are missing from the first claim statement. If the set of extracted claim variables is incomplete, as compared to the required claim variables, at step 414 the provider computing system 110 will generate and transmit a response to the original claim statement requesting further information in another claim statement, returning to step 406 within method 400. For example, the provider computing system 110 may generate (e.g., using generative AI) a response, a prompt, or other text to request further information in another claim statement. If the set of claim variables is complete, at step 420, the provider computing system 110 stores the completed claim statement to a database. At step 422, the provider computing system 110 processes the claim.

Referring to the method 400 in more detail, at step 402, the user device 150 requests, by a user (e.g., a provider customer, a claimant of the provider, a provider employee, a provider agent, etc.) input in the I/O circuit 156 (e.g., a microphone, a touchscreen, etc.), a claim to be generated. In some embodiments, the request for claim generation is transmitted through the network 105 to the provider computing system 110. At step 404, the request is received by the provider computing system 110, creating a new claim.

At step 406, the user provides a statement regarding the claim. In some embodiments, the statement regarding the claim is input on the user device (e.g., a touchscreen, a microphone, etc.).

Accordingly, at step 408 the claim statement regarding the claim is received by the provider computing system 110. The claim statement may be a one of a plurality of claim statements corresponding to the claim. At step 410, the provider computing system 110 provides the claim statement to one or more machine learning models. The logic, reasoning, and orchestration circuit 130 generates an output of claim variables extracted from the claim statement. In some embodiments the output may take form of a claim data packet for storage in a database (e.g., database 140 or database 172). The extracted claim variables may be displayed on the user device 150. In some embodiments, when the extracted claim variables are displayed on the user device 150, the user may edit the extracted claim variables (e.g., via a user input). For example, the user may change an extracted claim variable if the user believes that the extracted claim variable is incorrect.

At step 412, the provider computing system 110 determines if the set of claim variables is complete. In some embodiments, the logic, reasoning, and orchestration circuit 130 may examine the output of claim variables to determine if all necessary claim variables are included. In other embodiments, the claim processing server 160 receives set of claim variables and examines the received set of claim variables to determine if all necessary claim variables are included. In these embodiments, the provider computing system 110 may provide one or more sets of claim variables to the claim processing server 160 and receive, from the claim processing server 160, an indication of whether the set(s) of claim variables is complete or incomplete. If the set of claim variables is incomplete or if an aggregate of multiple sets of claim variables is incomplete, the provider computing system 110 may receive, from the claim processing server 160, an indication of one or more claim variables that are missing from the set of claim variables. In some embodiments, the provider computing system 110 determines that the set of claim variables is incomplete based on determining that a portion of the claim variables are complete (e.g., an initial set of claim variables is complete, but a complete set of variables necessitates additional claim variables.

In any of the above-described embodiments, one or more sets of claim variables may be compared to a predetermined set of claim variables (e.g., a required set of claim variables). In some embodiments, the one or more sets of claim variables may include a first set of claim variables corresponding to a first claim statement, second set of claim variables corresponding to a second claim statement, etc., where each claim statement corresponds to the same claim. The provider computing system 110 (and/or the claim processing server 160) may identify a missing claim variable responsive to determining that the missing claim variable is in the predetermined set of claim variables and not in the set of claim variables.

If the set of claim variables is determined to be complete, the method proceeds to step 420. Otherwise, the method 400 proceeds to step 414. One or more of the necessary claim variables may be associated with a variable category, for example, location information, vehicle operation, vehicle damage, or the like. The provider computing system 110 may associate the identified claim variables with one or more categories. For example, where the claim statement includes a description of a street and an intersection, those variables may be associated with a location category.

At step 414, the provider computing system 110 creates a request for further claim information. In some embodiments, the request is generated by the logic, reasoning, and orchestration circuit 130. In other embodiments, the request generation may occur on the user device 150. The request may be associated with one or more categories. The provider computing system 110 may cause the user device 150 to display the request. The request may include identified claim variables associated with the missing claim information. In an example operating scenario, at step 412, the provider computing system 110 may determine that set of claim variables is incomplete. The provider computing system 110 may cause the user device 150 to display the request. The request may include a query for information (e.g., a second or subsequent claim statement) regarding at least one missing claim variable. For example, the provider computing system 110 may generate a request regarding the location category.

At step 416, the user device 150 presents the request for further claim information and outputs the request to the user. The request may include one or more of the identified claim variables to provide context for the user. In some embodiments, the output may be a user interface on a display controlled by the I/O circuit 156. In other embodiments, the output may be an audio message played through an I/O device (e.g., a speaker) controlled by the I/O circuit 156. The method 400 then proceeds to step 406 to input another statement by the user, until the completeness conditions of step 412 are satisfied.

At step 420, the provider computing system 110 saves claim statements and extracted claim variables to a database. In some embodiments, the provider computing system 110 saves the claim data to a local database 140. Additionally, the provider computing system 110 may save the claim data to the database 172. In some embodiments, the provider computing system 110 may combine all claim statements input by the user by the repeated step 406 to a single claim statement before saving. In other embodiments, the provider computing system 110 may separate each claim statement generated by the repeated step 406.

At step 422, the provider computing system 110 processes the claim. In some embodiments, the provider computing system 110 is configured to provide the claim statements and/or the extracted claim variables to the claims processing server 160. The claims processing server 160 is configured to process the claims based on the extracted claim variables. For example, the claims processing server 160 may determine a claim outcome based on the extracted claim variables. More specifically, the claims processing server 160 may use a model (e.g., a statistical model, a mathematical model, a machine learning model, etc.) that correlates claim variables to a "claim outcome". As used herein a "claim outcome" refers to information regarding a result of a received insurance claim. For example, claim outcome may include payout amount, an indication of damage to the vehicle, an indication of whether the vehicle is totaled, an at-fault party, and/or other information regarding an outcome of the claim. In this way, the claims processing server 160 may generate a claim outcome. In some embodiments, the claims processing server 160 may provide the claim outcome to the provider computing system 110. That is, the provider computing system 110 may receive a claim outcome from the claims processing server 160. In some embodiments, the provider computing system 110 may cause the user device 150 to display the claim outcome.

Figure 5:
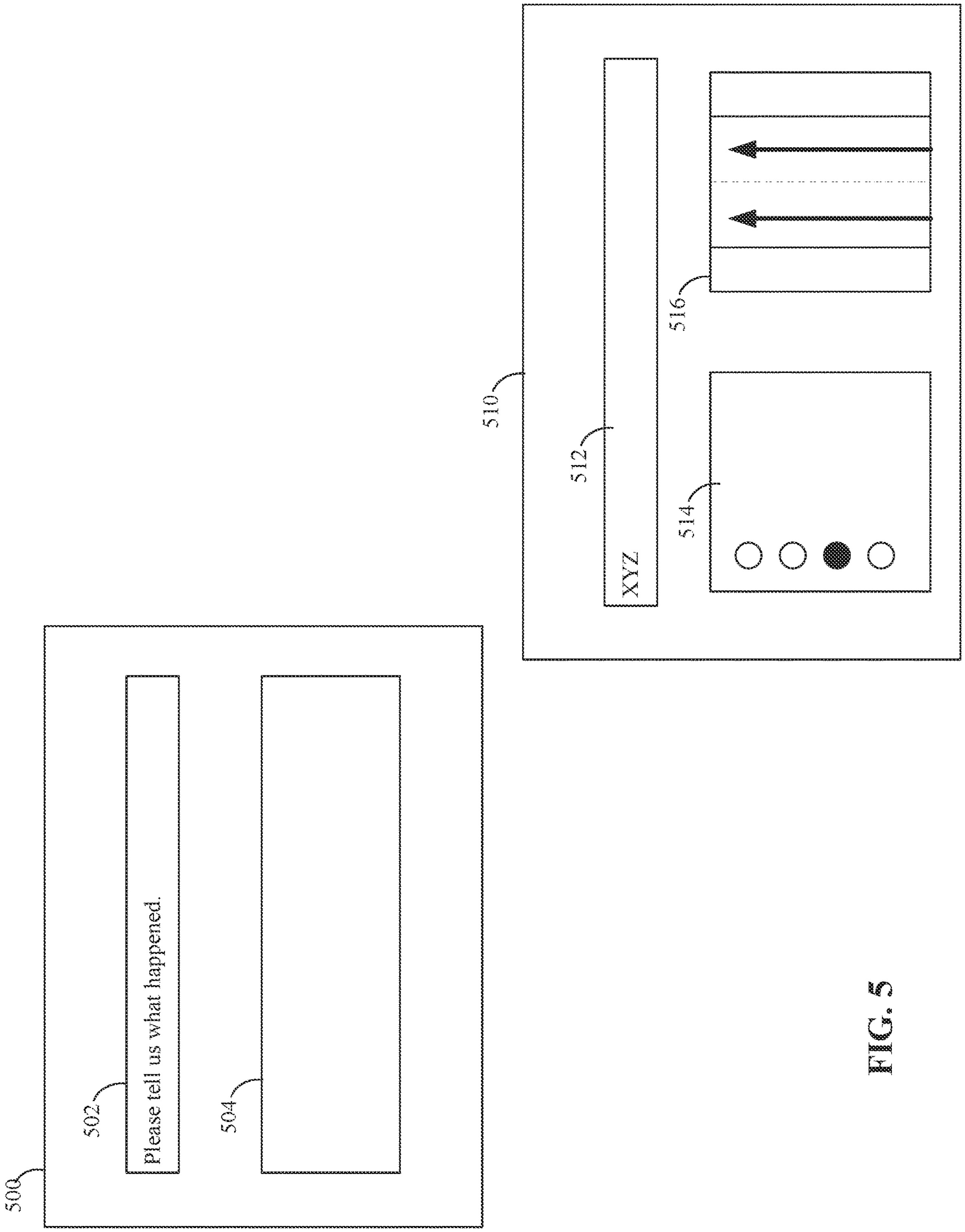
FIG. 5 is an illustration of aspects of a user interface, according to an example embodiment.

FIG. 5 is an illustration showing various aspects of a general user interface 500 and a user interface 510, according to an example embodiment. As briefly described above the user interface 500 and/or the user interface 510 may be generated by the provider computing system 110 and/or the user device 150. In some embodiments the user interface 500 and the user interface 510 may be generated by the claims processing server 160. The user interface 500 and the user interface 510 may be displayed by a display of the provider computing system 110 and/or the user device 150. Additionally, in some embodiments, the user interface 500 and the user interface 510 may be displayed by a display of the claims processing server 160.

The user interface 500 includes one or more graphical representations of the request for a claim statement described herein above to a user (e.g., a provider customer, a claimant of the provider, a provider employee, a provider agent). The first graphical feature 502 may include a text box populated with a request for information or a graphical representation of a request for more detailed claim information. As shown, in some embodiments a second graphical feature 504 may include displaying user input as mentioned herein above for the user to reference.

The user interface 510 includes one or more graphical representations of the request for additional details within a claim statement request described herein above. The first graphical feature 512 may include a text box populated with a request for information or a graphical representation of a request for more detailed claim information. The second graphical feature 514 may include a graphical system for a user to select an option (e.g., a radio button selection dialog). In an example embodiment, the graphical feature 514 may be interacted with using an input device (e.g., a keyboard, a mouse, a touchscreen, etc.) on a user device 150 and/or a provider computing system 110. The third graphical feature 516 may be a graphical representation to provide clarifying graphics and/or text. In some embodiments, the user interface 510 may display the contents of a claim statement provided.

The result is an improved user interface that advantageously displays content specific to what a claim request may require. More specifically, the improved user interface is automatically generated to display content based on the information extracted from the claim statement.

In one embodiment, the system 100 may receive non-text based data from the user device 150, such as image data, video data, or audio data. The system 100, such as by the provider computing system 110, the claims processing server 160, or another component system analyzes the non-text data from the user device 150. In one embodiment, claim variables are extracted from the non-text data. These claim variables may be analyzed to determine if they provide required claim variables in the process as show in FIG. 4. For example, a user device may upload a video of a vehicle crash scene, and object recognition may be utilized to extract information such as vehicle make/model, license plate number, VIN, layout of the roadway such as number of lanes, presence of traffic control devices such as stop signs or traffic lights, etc.

Referring to FIGS. 6A-6K, an illustration showing various aspects of a user interface 600 are shown, according to an example embodiment. The user interface 600 may be generated by the provider computing system 110 and/or the user device 150. As described herein, the provider computing system 110 and/or the user device 150 may use a trained generative AI model to generate a prompt, a response, or other text, and the provider computing system 110 and/or the user device 150 may provide the generated text on the user interface 600. In some embodiments the user interface 600 may be generated by the claims processing server 160. The user interface 600 may be displayed by a display of the provider computing system 110 and/or the user device 150. Additionally, in some embodiments, the user interface 600 may be displayed by a display of the claims processing server 160. The user interface 600 includes one or more graphical representations of the request for a claim statement described herein above to a user (e.g., a provider customer, a provider employee, a provider agent).

Figures 6A, 6B, 6C, 6D:
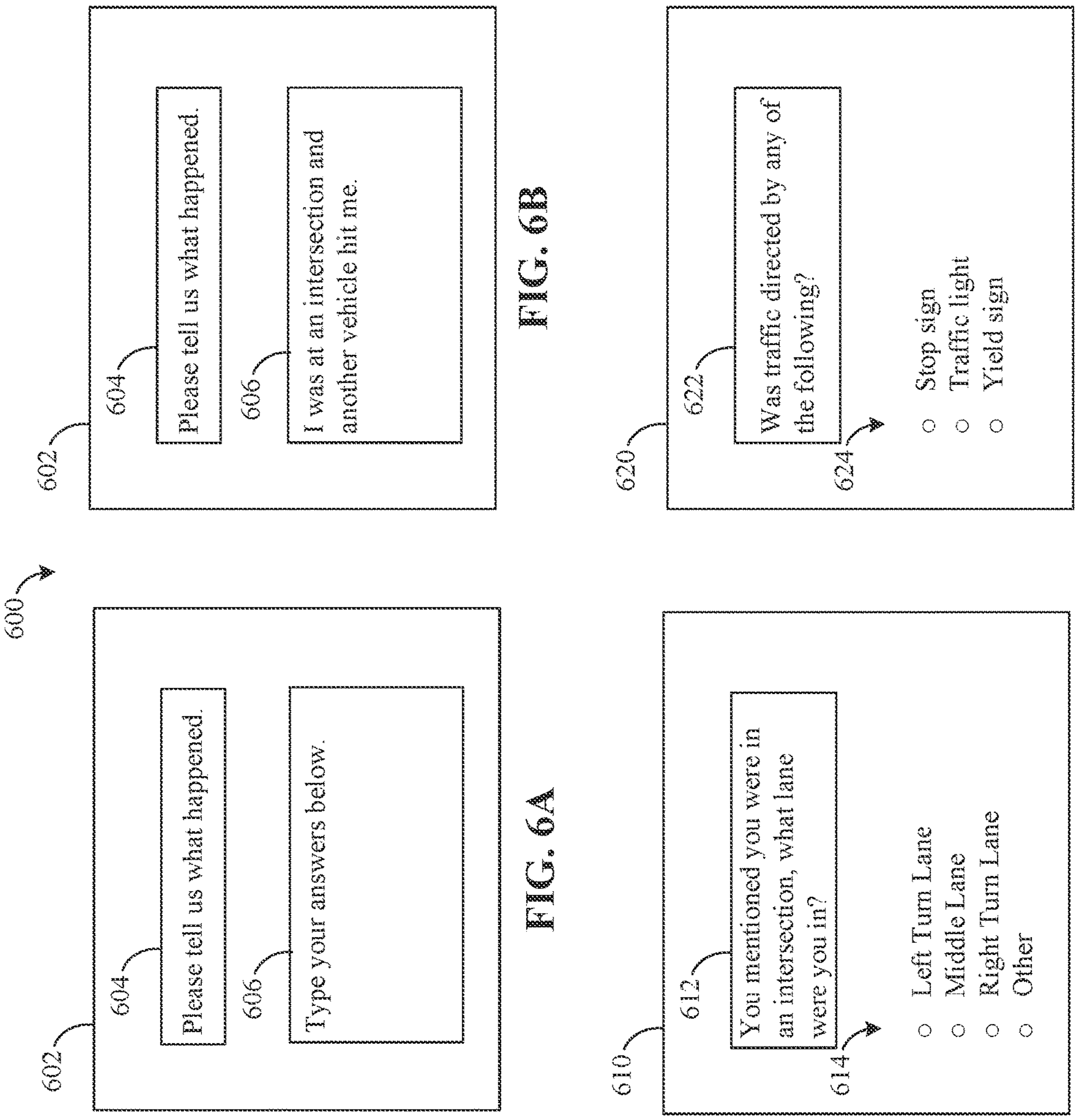
FIGS. 6A-6K are illustrations of aspects of a user interface, according to an example embodiment.

FIG. 6A shows a first portion 602 of the user interface 600. The first portion 602 includes a first graphical feature 604, shown as a text box populated with a request for information or a graphical representation of a request for claim information. As shown, in some embodiments a second graphical feature 606, shown as a user input field (e.g., a text input, a voice input, image input, etc.). FIG. 6B shows the first portion 602 with an example user input shown in the second graphical feature 606.

FIG. 6C shows a second portion 610 of the user interface 600. The second portion 610 includes a third graphical feature 612, shown as a text box populated with a request for information, based on the user input to the second graphical feature 606. As described above, the provider computing system 110 may extract a claim variable from the user input (e.g., the input into the second graphical feature 606) and generate a response requesting further claim information (e.g., the third graphical feature 612) regarding a missing claim variable. As shown in FIG. 6C, the second portion 610 of the user interface 600 includes a fourth graphical feature 614, shown as a multiple choice selection input. A user may interact with the fourth graphical feature 614 to select at least one of the multiple choices. In some embodiments, when the provider computing system 110 generates a response requesting further claim information, the provider computing system 110 may also generate the multiple choice input (e.g., the fourth graphical feature 614) based on the extracted claim variable from the user input (e.g., the input into the second graphical feature 606). The multiple choice input may include choices regarding the missing claim variable.

FIG. 6D shows a third portion 620 of the user interface 600. The third portion 620 includes a fifth graphical feature 622, shown as a text box populated with a request for information, based on the user input to the second graphical feature 606. As described above, the provider computing system 110 may extract a claim variable from the user input (e.g., the input into the second graphical feature 606) and generate a response requesting further claim information (e.g., the fifth graphical feature 622) regarding a missing claim variable. As shown in FIG. 6D, the third portion 620 of the user interface 600 includes a sixth graphical feature 624, shown as a multiple choice selection input. A user may interact with the sixth graphical feature 624 to select at least one of the multiple choices. In some embodiments, when the provider computing system 110 generates a response requesting further claim information, the provider computing system 110 may also generate the multiple choice input (e.g., the sixth graphical feature 624) based on the extracted claim variable from the user input (e.g., the input into the second graphical feature 606). The multiple choice input may include choices regarding the missing claim variable.

Figure 6E:
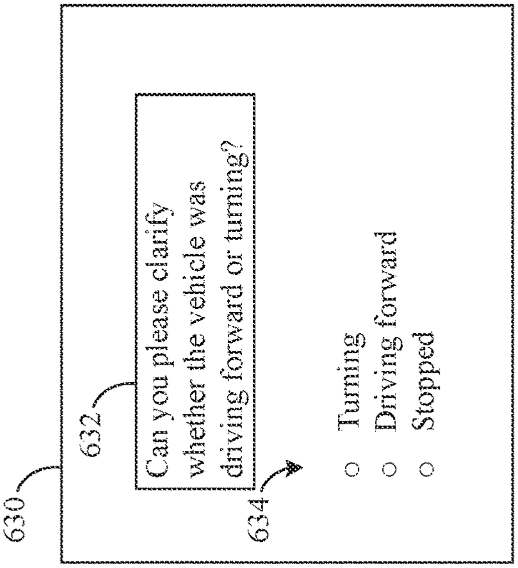

FIG. 6E shows a fourth portion 630 of the user interface 600. The fourth portion 630 includes a seventh graphical feature 632, shown as a text box populated with a request for information, based on the user input to the second graphical feature 606. As described above, the provider computing system 110 may extract a claim variable from the user input (e.g., the input into the second graphical feature 606) and generate a response requesting further claim information (e.g., the seventh graphical feature 632) regarding a missing claim variable. As shown in FIG. 6E, the fourth portion 630 of the user interface 600 includes an eighth graphical feature 634, shown as a multiple choice selection input. A user may interact with the eighth graphical feature 634 to select at least one of the multiple choices. In some embodiments, when the provider computing system 110 generates a response requesting further claim information, the provider computing system 110 may also generate the multiple choice input (e.g., the eighth graphical feature 634) based on the extracted claim variable from the user input (e.g., the input into the second graphical feature 606). The multiple choice input may include choices regarding the missing claim variable.

Figure 6F:
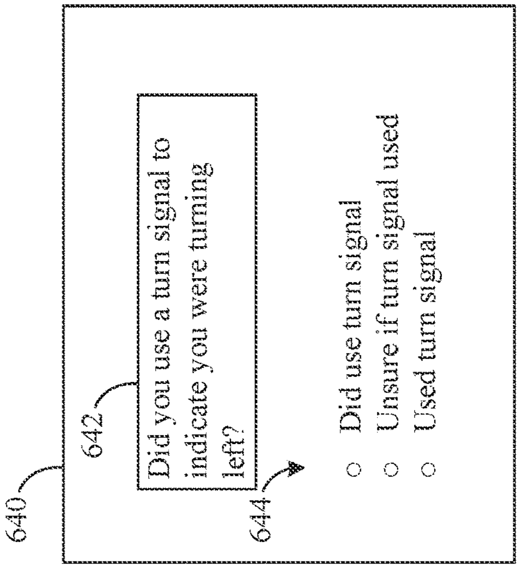

FIG. 6F shows a fifth portion 640 of the user interface 600. The fifth portion 640 includes a ninth graphical feature 642, shown as a text box populated with a request for information, based on the user input to the second graphical feature 606. As described above, the provider computing system 110 may extract a claim variable from the user input (e.g., the input into the second graphical feature 606) and generate a response requesting further claim information (e.g., the ninth graphical feature 642) regarding a missing claim variable. As shown in FIG. 6F, the fifth portion 640 of the user interface 600 includes a tenth graphical feature 644, shown as a multiple choice selection input. A user may interact with the tenth graphical feature 644 to select at least one of the multiple choices. In some embodiments, when the provider computing system 110 generates a response requesting further claim information, the provider computing system 110 may also generate the multiple choice input (e.g., the tenth graphical feature 644) based on the extracted claim variable from the user input (e.g., the input into the second graphical feature 606). The multiple choice input may include choices regarding the missing claim variable.

Figure 6G:
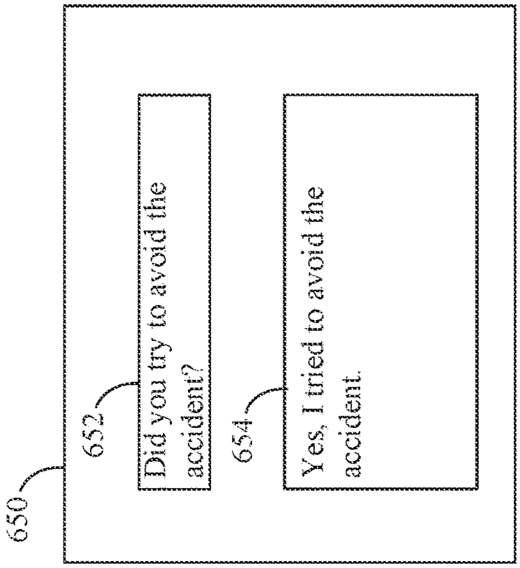

FIG. 6G shows a sixth portion 650 of the user interface 600. The sixth portion 650 includes an eleventh graphical feature 652, shown as a text box populated with a request for information. As described above, the provider computing system 110 may determine whether claim variable information is missing and generate a response requesting further claim information (e.g., the eleventh graphical feature 652) regarding a missing claim variable. As shown in FIG. 6G, the sixth portion 650 of the user interface 600 includes a twelfth graphical feature 654, shown as a user input field. A user may interact with the twelfth graphical feature 654 to input a response to the request for further claim information.

Figure 6H:
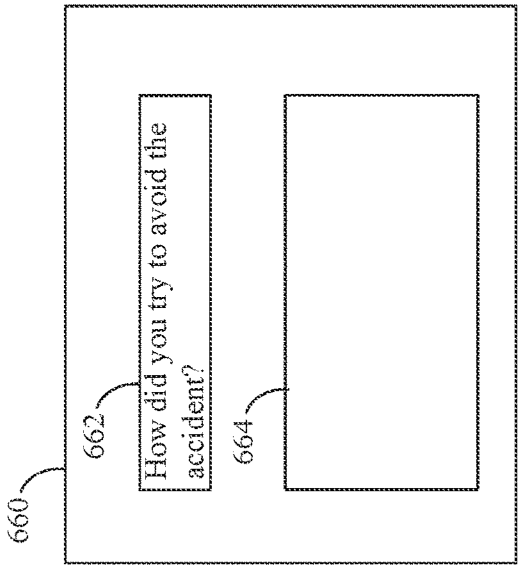

FIG. 6H shows a seventh portion 660 of the user interface 600. The seventh portion 660 includes a thirteenth graphical feature 662, shown as a text box populated with a request for information. As described above, the provider computing system 110 may extract a claim variable from the user input (e.g., the input into the twelfth graphical feature 654) and generate a response requesting further claim information (e.g., the thirteenth graphical feature 662) regarding a missing claim variable. Here, even though the user answered the question in graphical feature 652, the answer included insufficient details to determine a claim variable. As shown in FIG. 6H, the seventh portion 660 of the user interface 600 includes a fourteenth graphical feature 664, shown as a user input field. A user may interact with the fourteenth graphical feature 664 to input a response to the request for further claim information.

Figure 6I:
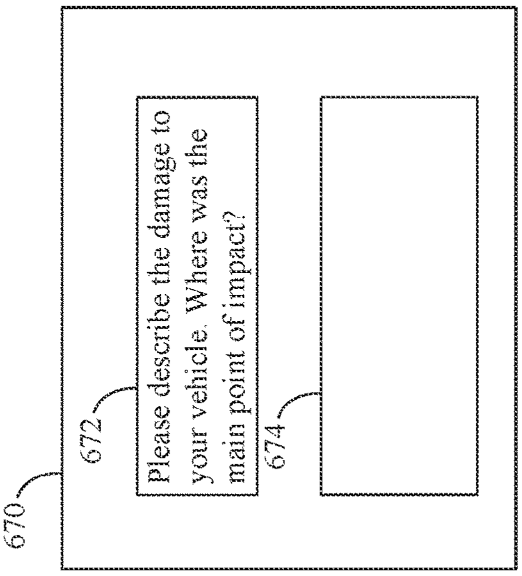

FIG. 6I shows an eighth portion 670 of the user interface 600. The eighth portion 670 includes a fifteenth graphical feature 672, shown as a text box populated with a request for information. As described above, the provider computing system 110 may determine whether claim variable information is missing and generate a response requesting further claim information (e.g., the fifteenth graphical feature 672) regarding a missing claim variable. As shown in FIG. 6I, the eighth portion 670 of the user interface 600 includes a sixteenth graphical feature 674, shown as a user input field. A user may interact with the sixteenth graphical feature 674 to input a response to the request for further claim information.

Figure 6J:
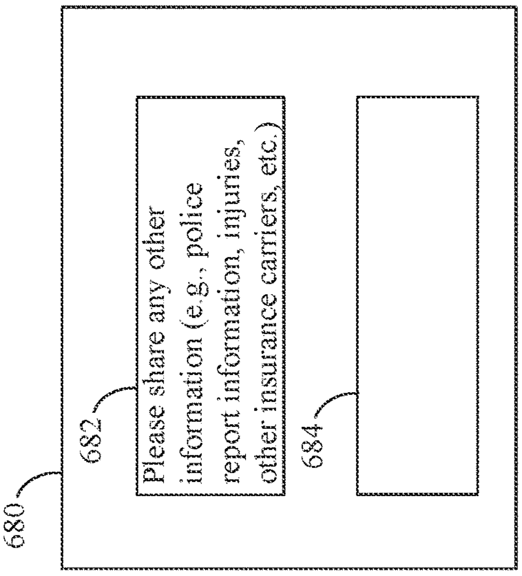

FIG. 6J shows a ninth portion 680 of the user interface 600. The ninth portion 680 includes a seventeenth graphical feature 682, shown as a text box populated with a request for information. As described above, the provider computing system 110 may determine whether claim variable information is missing and generate a response requesting further claim information (e.g., the seventeenth graphical feature 682) regarding a missing claim variable. Here, the seventeenth graphical feature 682 includes a general prompt for additional information that the user may have forgotten to include previously. As shown in FIG. 6J, the ninth portion 680 of the user interface 600 includes a eighteenth graphical feature 684, shown as a user input field. A user may interact with the eighteenth graphical feature 684 to input a response to the request for further claim information.

Figure 6K:
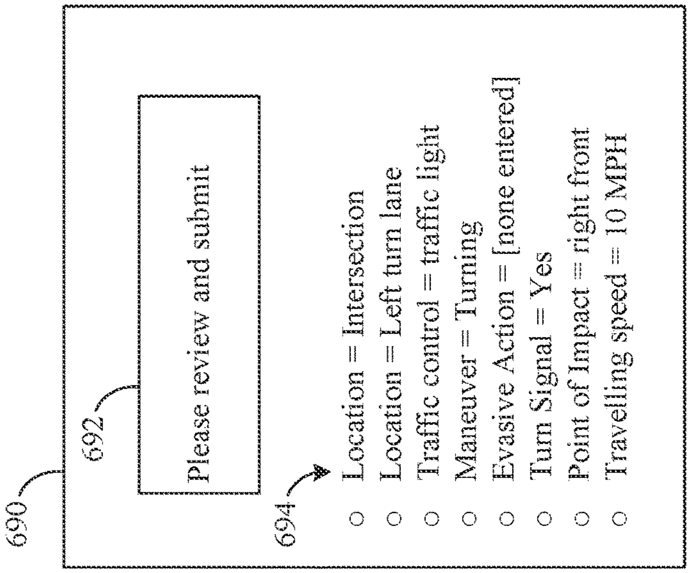

FIG. 6K shows a tenth portion 690 of the user interface 600. The tenth portion 690 includes a nineteenth graphical feature 692, shown as a text box populated with a request for the user to verify previously entered information. The provider computing system 110 may be structured to request that a user verify extracted claim variables and, if one or more extracted claim variables are not correct, display a pervious displayed portion of the user interface 600 that corresponds to a user input associated with the incorrect extracted claim variable. As shown in FIG. 6K, the tenth portion 690 of the user interface 600 includes a twentieth graphical feature 694, shown as a summary of extracted claim variables. A user may interact with the twentieth graphical feature 694 to verify previous inputs.

As described herein, the portions of the user interface 600 may be displayed sequentially, concurrently, or partially concurrently.

Figure 7:
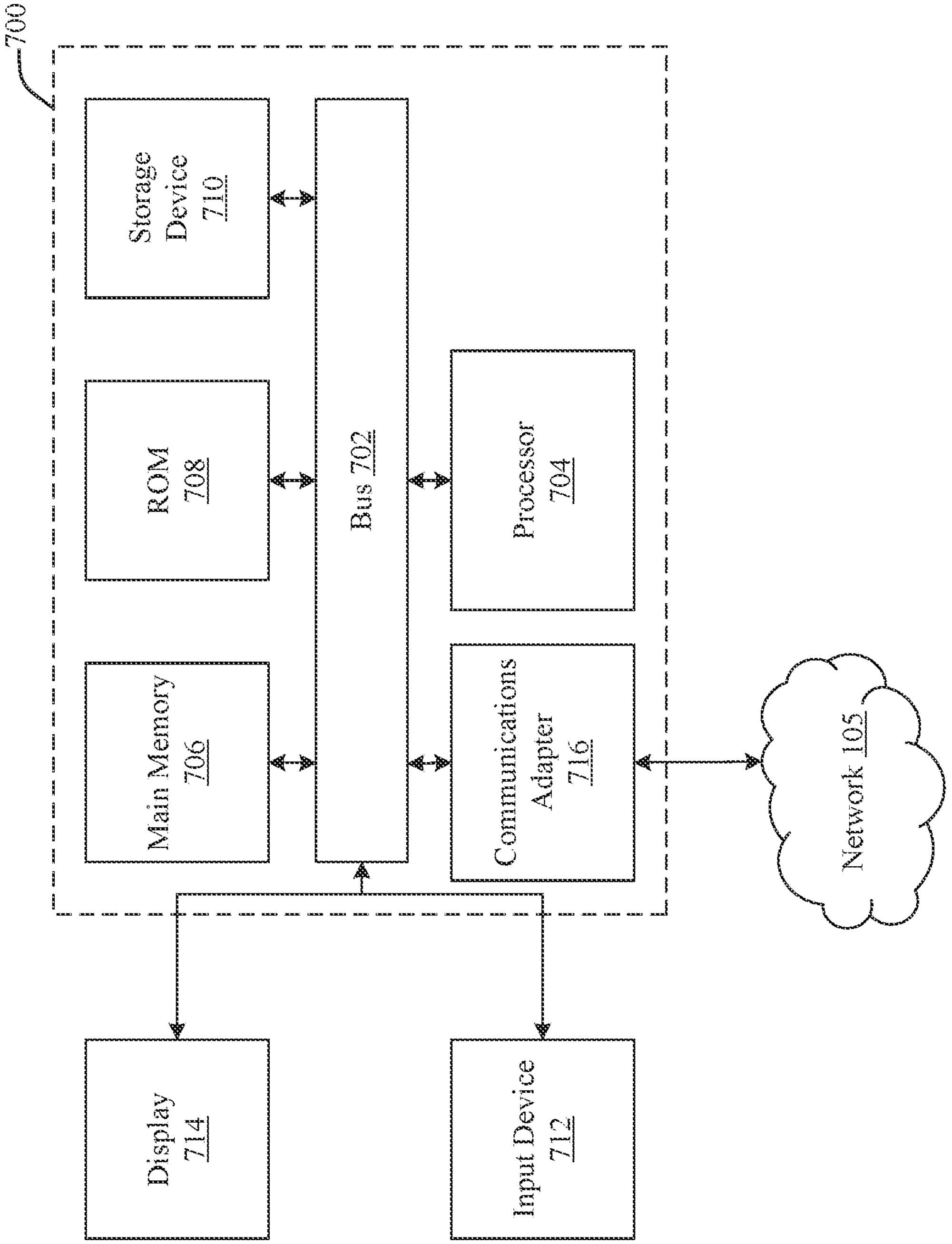
FIG. 7 is a component diagram of an example computing system suitable for use in the various embodiments described herein.

FIG. 7 is a component diagram of an example computing system suitable for use in various embodiments described herein. For example, the computing system 700 may implement an example provider computing system 110, the user device 150, the claims processing server 160, and/or various other example systems and devices described in the present disclosure.

The computing system 700 includes a bus 702 or other communication component for communicating information and a processor 704 coupled to the bus 702 for processing information. The computing system 700 also includes main memory 706, such as a random access memory (RAM) or other dynamic storage device, coupled to the bus 702 for storing information and instructions to be executed by the processor 704. Main memory 706 can also be used for storing position information, temporary variables, or other intermediate information during execution of instructions by the processor 704. The computing system 700 may further include a read only memory (ROM) 708 or other static storage device coupled to the bus 702 for storing static information and instructions for the processor 704. A storage device 710, such as a solid state device, magnetic disk, or optical disk, is coupled to the bus 702 for persistently storing information and instructions.

The computing system 700 may be coupled via the bus 702 to a display 714, such as liquid crystal display, or active matrix display, for displaying information to a user. An input device 712, such as a keyboard including alphanumeric and other keys, may be coupled to the bus 702 for communicating information, and command selections to the processor 704. In another embodiment, the input device 712 has a touch screen display. The input device 712 can include any time of biometric sensor, a cursor control, such as a mouse, a trackball, or cursor direction keys, for communicating direction information and command selections to the processor 704 and controlling cursor movement on the display 714.

In some embodiments, the computing system 700 may include a communications adapter 716, such as a networking adapter. Communications adapter 716 may be coupled to a bus 702 and may be configured to enable communications with a computing or communication network 105 and/or other computing systems. In various illustrative embodiments, any type of networking configuration may be achieved using communications adapter 616, such as wired (e.g., via Ethernet), wireless (e.g., via Wi-Fi, Bluetooth), satellite (e.g., via GPS) pre-configured, ad-hoc. LAN, WAN, and the like.

According to various embodiments, the processes that effectuate illustrative embodiments that re described herein can be achieved by the computing system 700 in response to the processor 704 executing an arrangement of instructions contained in main memory 706. Such instructions can be read into main memory 706 from another computer-readable medium, such as the storage device of 710. Execution of the arrangement of instructions contained in main memory 706 causes the computing system 700 to perform the illustrative processes describes herein. One or more processors in a multi-processing arrangement may also be employed to execute the instructions contained in main memory 706. In alternative embodiments, hard-wired circuitry may be used in place of or in combination with software instructions to implement illustrative embodiments. Thus, embodiments are not limited to any specific combination of hardware circuitry and software.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and/or alternative currencies.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A provider computing system comprising:
- a communication interface structured to communicatively couple the provider computing system to a network;
- a claims database storing claim statements for a plurality of claims, the claim statements comprising a plurality of claim variables;
- an orchestration circuit storing computer-executable instructions embodying one or more machine learning models;
- at least one processor; and
- at least one memory, the at least one memory storing instructions that, when executed by the at least one processor, cause the at least one processor to:
  - receive a first claim statement comprising natural language text corresponding to a new claim;
  - cause, by the orchestration circuit, the one or more machine learning models to parse the natural language text in the first claim statement to extract one or more claim variables from the first claim statement;
  - after determining that at least one claim variable of a predetermined set of claim variables is missing from the one or more claim variables, generate, by the orchestration circuit, a response comprising a request for a second claim statement requesting information regarding the at least one missing claim variable; and
  - transmit the request for a second claim statement.

2. The provider computing system of claim 1, wherein the instructions further cause the at least one processor to train, by the orchestration circuit, the one or more machine learning models based on a subset of the claim statements such that the one or more machine learning models outputs a predicted plurality of claim variables based on the claim statements.

3. The provider computing system of claim 2, wherein the instructions further cause the at least one processor to generate, by a synthetic statement generating circuit of the provider computing system, a new plurality of synthetic claim statements.

4. The provider computing system of claim 3, wherein the instructions further cause the at least one processor to train, by the orchestration circuit, the one or more machine learning models based on the plurality of synthetic claim statements such that the one or more machine learning models outputs a predicted plurality of claim variables based on the synthetic claim statement.

5. The provider computing system of claim 1, wherein the instructions further cause the at least one processor to:
- provide the one or more claim variables to a claims processing server;
- receive, from the claims processing server, a claim outcome; and
- cause a user device to display the claim outcome.

6. The provider computing system of claim 5, wherein the instructions further cause the at least one processor to:
- receive the second claim statement comprising additional natural language text;
- cause, by the orchestration circuit, the one or more machine learning models to parse the additional natural language text in the second claim statement to extract one or more additional claim variables; and
- provide the one or more additional claim variables to the claims processing server.

7. A method comprising:
- communicatively coupling, by a communication interface, a provider computing system to a network;

receiving, from a user device, a first claim statement comprising natural language text corresponding to a first claim;

parsing, by one or more machine learning models associated with an orchestration circuit of the provider computing system, the natural language text in the first claim statement to extract one or more claim variables from the first claim statement;

comparing the one or more claim variables to a predetermined set of required claim variables;

responsive to determining that at least one required claim variable of the set of required claim variables is not present in the one or more claim variables, generating, by the orchestration circuit of the provider computing system, a request for a second claim statement;

transmitting the request for the second claim statement to the user device;

receiving the second claim statement comprising additional natural language text corresponding to the first claim;

parsing, by the one or more machine learning models associated with the orchestration circuit of the provider computing system, the additional natural language text in the second claim statement to extract one or more additional claim variables from the second claim statement;

comparing the one or more claim variables and the one or more additional claim variables to the predetermined set of required claim variables; and responsive to determining that each of the required claim variables of the set of required claim variables are in at least one of the one or more claim variables or the one or more additional claim variables, causing the user device to display one or more claim variables and the one or more additional claim variables.

8. The method of claim 7, further comprising training, by the orchestration circuit, the one or more machine learning models based on at least the first claim statement such that the one or more machine learning models outputs a predicted plurality of claim variables based on the first claim statement.

9. The method of claim 8, further comprising generating, by a synthetic statement generating circuit of the provider computing system, a new plurality of synthetic claim statements.

10. The method of claim 9, further comprising training, by the orchestration circuit, the one or more machine learning models based on a subset of the synthetic claim statements such that the one or more machine learning models outputs a predicted plurality of claim variables based on the synthetic claim statements.

11. The method of claim 7, further comprising:

providing the one or more claim variables to a claims processing server;

receiving, from the claims processing server, a claim outcome; and causing the user device to display the claim outcome.

12. The method of claim 7, further comprising:

generating at least one graphical feature displaying a question regarding the at least one required claim variable that is not present in the one or more claim variables; and causing the user device to display the at least one graphical feature.

13. A computing system for processing insurance claims comprising: a communication interface structured to communicatively couple the computing system to a network;

an orchestration circuit storing computer-executable instructions embodying one or more machine learning models;

at least one processor; and at least one memory, the at least one memory storing instructions that, when executed by the at least one processor, cause the at least one processor to:

receive a first claim statement comprising natural language text corresponding to a new claim;

cause, by the orchestration circuit, the one or more machine learning models to parse the natural language text in the first claim statement to extract one or more claim variables;

provide the one or more claim variables to a claims processing server via the network;

receive, from the claims processing server, at least one of: an indication that at least one claim variable is missing from the one or more claim variables, or an indication that the one or more claim variables is complete;

responsive to receiving the indication that the at least one claim variable is missing from the one or more claim variables, generate, by the orchestration circuit, a response comprising a request for a second claim statement;

transmit the request for a second claim statement;

responsive to receiving the indication that the one or more claim variables is complete, provide the one or more claim variables to a claims processing server;

receive, from the claims processing server, a claim outcome; and cause the user device to display the claim outcome.

14. The computing system of claim 13, wherein the instructions further cause the at least one processor to train, by the orchestration circuit, the one or more machine learning models based on at least one of the first claim statement or the second claim statement such that the one or more machine learning models outputs a predicted plurality of claim variables based on the first claim statement or the second claim statement.

15. The computing system of claim 14, wherein the instructions further cause the at least one processor to:

generate, by a synthetic statement generating circuit of the provider computing system, a new plurality of synthetic claim statements; and train, by the orchestration circuit, the one or more machine learning models based on the plurality of synthetic claim statements such that the one or more machine learning models outputs a predicted plurality of claim variables based on the synthetic claim statements.

16. The computing system of claim 13, wherein generating, by the orchestration circuit, the response comprising the request for the second claim statement comprises generating a first graphical feature displaying a question regarding at least one missing claim variable.

17. The computing system of claim 16, wherein generating, by the orchestration circuit, the response comprising the request for the second claim statement comprises generating a second graphical feature displaying a multiple choice input, the multiple choice input including choices regarding the missing claim variable.

18. The computing system of claim 13, wherein the instructions further cause the at least one processor to:

receive the second claim statement comprising additional natural language text;

cause, by the orchestration circuit, the one or more machine learning models to parse the additional natural language text in the second claim statement to extract one or more additional claim variables; and provide the one or more additional claim variables to the claims processing server.

19. The computing system of claim 13, wherein the instructions further cause the at least one processor to:

receive, from the claims processing server, an indication that a combination of the one or more claim variables and the one or more additional claim variables is complete; and provide the one or more claim variables and the one or more additional claim variables to the claims processing server.

* * * * *